(12) United States Patent
Xu et al.

(10) Patent No.: US 10,361,175 B2
(45) Date of Patent: Jul. 23, 2019

(54) VOLTAGE DROOP MITIGATION IN 3D CHIP SYSTEM

(71) Applicant: Advanced Micro Devices, Inc., Sunnyvale, CA (US)

(72) Inventors: Yi Xu, Jiangsu Province (CN); Xing Hu, Beijing (CN); Yuan Xie, State College, PA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 123 days.

(21) Appl. No.: 15/428,536

(22) Filed: Feb. 9, 2017

(65) Prior Publication Data

US 2017/0153916 A1    Jun. 1, 2017

Related U.S. Application Data

(62) Division of application No. 14/144,920, filed on Dec. 31, 2013, now Pat. No. 9,595,508.

(30) Foreign Application Priority Data

Dec. 9, 2013 (CN) .......................... 2013 1 0659511

(51) Int. Cl.
    *G06F 17/50*     (2006.01)
    *H01L 25/07*     (2006.01)
    (Continued)

(52) U.S. Cl.
    CPC ............ *H01L 25/074* (2013.01); *G06F 1/329* (2013.01); *G06F 9/4881* (2013.01); *G06F 17/5031* (2013.01); *H01L 25/0657* (2013.01); *G06F 17/5045* (2013.01); *G06F 2217/78* (2013.01); *G06F 2217/84* (2013.01); *H01L 23/5286* (2013.01); *H01L 2224/16145* (2013.01); *H01L 2224/16225* (2013.01);
    (Continued)

(58) Field of Classification Search
    CPC ............ G06F 17/5045; G06F 17/5031; G06F 2217/78; G06F 2217/84
    USPC ......... 716/106, 108–111, 113, 132–134, 136
    See application file for complete search history.

(56) References Cited

U.S. PATENT DOCUMENTS

7,205,805 B1    4/2007   Bennett
7,739,626 B2    6/2010   Jin
(Continued)

*Primary Examiner* — Stacy Whitmore
(74) *Attorney, Agent, or Firm* — Faegre Baker Daniels LLP (57) ABSTRACT

The present invention relates to a multichip system and a method for scheduling threads in 3D stacked chip. The multichip system comprises a plurality of dies stacked vertically and electrically coupled together; each of the plurality of dies comprising one or more cores, each of the plurality of dies further comprising: at least one voltage violation sensing unit, the at least one voltage violation sensing unit being connected with the one or more cores of each die, the at least one voltage sensing unit being configured to independently sense voltage violation in each core of each die; and at least one frequency tuning unit, the at least one frequency tuning unit being configured to tune the frequency of each core of each die, the at least one frequency tuning unit being connected with the at least one voltage violation sensing unit. The multichip system and method described in present invention have many advantages, such as reducing voltage violation, mitigating voltage droop and saving power.

8 Claims, 6 Drawing Sheets

(51) Int. Cl.
  *G06F 1/329*   (2019.01)
  *G06F 9/48*    (2006.01)
  *H01L 25/065*  (2006.01)
  *H01L 23/528*  (2006.01)

(52) U.S. Cl.
  CPC ............ *H01L 2224/73253* (2013.01); *H01L 2225/06513* (2013.01); *H01L 2225/06517* (2013.01); *H01L 2225/06541* (2013.01); *H01L 2225/06589* (2013.01); *H01L 2924/0002* (2013.01); *H01L 2924/15311* (2013.01); *Y02D 10/24* (2018.01)

(56) References Cited

U.S. PATENT DOCUMENTS

| | | |
|---|---|---|
| 7,793,119 B2 | 9/2010 | Gammie |
| 7,921,313 B2 | 4/2011 | Ghiasi |
| 8,078,901 B1 | 12/2011 | Meyer |
| 8,081,011 B2 | 12/2011 | Azimi |
| 8,164,390 B1 | 4/2012 | Briggs |
| 8,295,950 B1 | 10/2012 | Wordsworth |
| 8,364,998 B2 | 1/2013 | Hsu |
| 8,463,973 B2 | 6/2013 | Naffziger |
| 8,527,801 B2 | 9/2013 | Brock |
| 8,661,274 B2 | 2/2014 | Hansquine |
| 8,689,023 B2 | 4/2014 | Gupta |
| 8,760,217 B2 | 6/2014 | Chua-Eoan |
| 8,775,843 B2 | 7/2014 | Frid |
| 8,819,615 B2 | 8/2014 | Le Coz |
| 8,839,006 B2 | 9/2014 | Li |
| 8,885,694 B2 | 11/2014 | Vatinel |
| 8,912,778 B1 | 12/2014 | Bennett |
| 8,963,599 B2 | 2/2015 | Dobbs |
| 8,972,755 B1 | 3/2015 | Hasko |
| 8,996,595 B2 | 3/2015 | Gargash |
| 9,134,782 B2 | 9/2015 | Reddy |
| 9,218,044 B2 | 12/2015 | Brock |
| 9,252,683 B2 | 2/2016 | Hunt |
| 9,430,353 B2 * | 8/2016 | Shafi ................. G06F 11/323 |
| 9,595,508 B2 | 3/2017 | Xu et al. |
| 9,658,877 B2 * | 5/2017 | Barwick ............ G06F 9/461 |
| 2002/0080516 A1 | 6/2002 | Bhakta |
| 2005/0218871 A1 | 10/2005 | Kang |
| 2012/0054515 A1 | 3/2012 | Naffziger |
| 2013/0181690 A1 | 7/2013 | Holloway |

* cited by examiner

VOLTAGE DROOP MITIGATION IN 3D CHIP SYSTEM

RELATED APPLICATIONS

This application is a divisional of non-provisional application Ser. No. 14/144,920, filed on Dec. 31, 2013, and titled VOLTAGE DROOP MITIGATION IN 3D CHIP SYSTEM, which claims priority to Chinese Application Serial No. 201310659511.X, filed on Dec. 9, 2013, and titled VOLTAGE DROOP MITIGATION IN 3D CHIP SYSTEM, both of which are incorporated herein by reference.

TECHNICAL FIELD OF THE INVENTION

The present invention relates generally to three-dimensional integrated circuit technology (3D chip technology). More specifically, the present invention relates to 3D stacked chips system and voltage control and regulation in a 3D stacked multichip system.

BACKGROUND OF THE INVENTION

Vertically stacked integrated circuits, with multiple dies interconnected vertically via through silicon vias (TSVs), are one kind of 3D integration circuit technology, which provide vertical stacking of two or more dies with a dense, high-speed interface. The global wire length is reduced by a factor of the square root of the number of layers used, leading to performance improvement and power reduction of the interconnection. Thus, three-dimensional integration technology is a promising technology in providing a dense and high-speed communication interface to achieve high performance with low transmission power.

Figure 1:
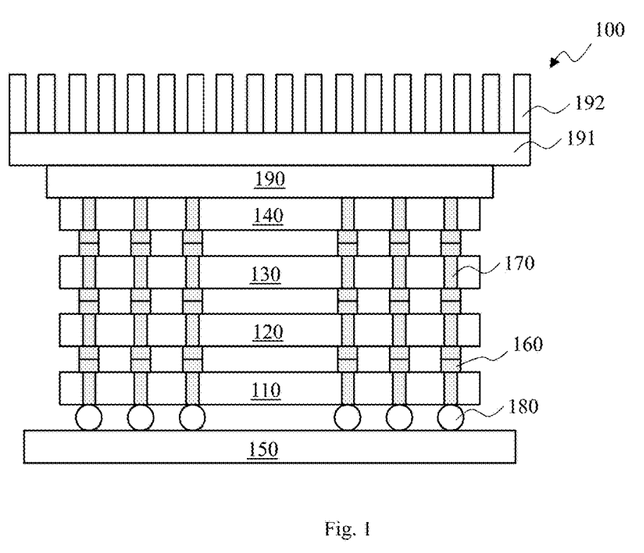
FIG. 1 shows an exemplary structure of a 3D stacked multichip package 100 in flip-chip packaging technology in prior art.

FIG. 1 shows a conceptual structure of a 3D stacked multichip package 100 using TSVs in flip-chip packaging technology. In the exemplary structure, four layers of chips or dies 110-140 are stacked successively on top of a package substrate 150 with multiple micro-connects 160. Through-silicon-via (TSV) 170 is used for passing both electrical and power signals. Power is delivered from an off-chip voltage regulator (not shown), through controlled-collapse-chip-connection (C4) bumps 180 to the bottom die 110, then to the upper dies 120-140 via TSV 170. A thermal interface material 190, heat sink 191 and heat spreader 192 are disposed over die 140 successively.

Figure 2:
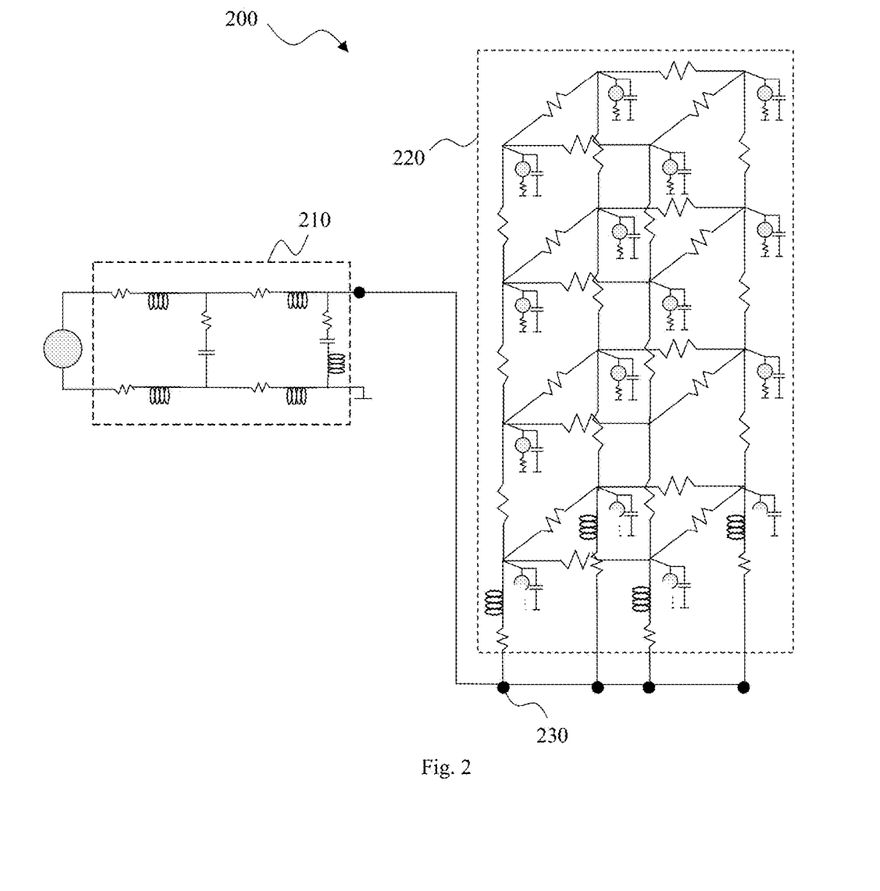
FIG. 2 shows an exemplary schematic figure of a power delivery system for a 3D stacked chip.

Often, a 3D stacked chip is powered by a power delivery system constituted of two parts, commonly known as off-chip paths and on-chip networks. The off-chip paths refer to the power delivery path from voltage source and/or package substrate to a chip. The on-chip network refers to the R(L)C network inside a chip, which usually comprises parasitic resistance, inductance in the delivery path and decoupling capacitance for eliminating transient voltage noise. A simplified circuit model of such a power delivery network to a 3D stacked multichip package is shown in FIG. 2, wherein power delivery system 200 for a 3D stacked multichip package comprises off-chip paths 210 and on-chip networks 220, both of them being marked by dotted boxes as shown in FIG. 2. The off-chip paths 210 deliver power from a voltage source to the 3D on-chip networks 220 via bumps 230.

Despite the promising features of rapid data transferring across layers, low transmission power and high device density, 3D integration techniques also confront many challenges, one of which is power supply noise. By stacking multiple dies vertically, 3D chips have higher load than the same-sized 2D chips, leading to larger voltage droop due to imperfect parasitic impedance of the power delivery network (PDN) and current fluctuation of circuits, damaging power integrity. Power integrity issues may cause timing failures, thereby degrading the system reliability.

SUMMARY OF EMBODIMENTS THE INVENTION

In 3D integration using TSVs, multi-layer dies are connected by through-silicon-vias (TSVs) vertically so as to form multiple layers of dies, and the connection length of dies is usually around 0.1%~1% of the connection length for 2D dies. Such short connection enables close voltage interaction between layers. However, the extremely short die to die distance in the vertical direction leads to strong voltage interference in the vertical direction. The short connection can aggravate the problem of thread resonance and make voltage droop even worse than that of 2D chips. Meanwhile, computing techniques such as Single-Program-Multiple-Data (SPMD) techniques in multithreaded applications may stimulate destructive interference (core resonances) among threads and exacerbate voltage droops.

To tackle the above-mentioned problems in 3D stacked multichip system, a conventional solution is to allocate sufficient voltage margin for the worst-case voltage droop. However, such solution will bring significant cost especially with the decreasing transistor size and increasing layer count in future 3D chips. Prior work has also focused on the impact of physical design and the floorplan on voltage droop in a 3D PDN and observed that increasing decoupling capacitance or TSV density alleviates voltage droops. Nevertheless, it would cost too much to place enough TSVs and decoupling capacitance on a chip to overcome the power integrity issue. Moreover, decoupling capacitors should be put next to the active circuits to reduce voltage noise effectively. Hence, a static solution may not be efficient and flexible because the status of the circuits changes dynamically.

Thus, in order to overcome the drawbacks in prior art, aspects of the present invention provide the following technical solutions.

In an example embodiment embodying a first aspect, a multichip system is provided. The multichip system comprises a plurality of dies stacked vertically and electrically coupled together. Each of the plurality of dies comprises one or more cores, each of the plurality of dies further comprises: at least one voltage violation sensing unit, the at least one voltage violation sensing unit being connected with the one or more cores of each die, the at least one voltage sensing unit being configured to independently sense voltage violation in each core of each die; and at least one frequency tuning unit, the at least one frequency tuning unit being configured to tune the frequency of each core of each die, the at least one frequency tuning unit being connected with the at least one voltage violation sensing unit.

In a second example embodiment embodying a second aspect, a layer-control method for a 3D stacked chip system is provided. The 3D stacked chip system comprises a plurality of dies stacked vertically, each of the plurality of dies comprising one or more cores. The method is performed independently for each die in the 3D stacked chip, and comprises: (a) sensing whether there is voltage violation in the one or more cores of a die by means of at least one voltage violation sensing unit connected with each core of the die; (b) if yes, tuning the frequency of the die by means of a frequency tuning unit connected with the voltage violation sensing unit; and (c) if no, continuing the step (a).

In a third example embodiment embodying a third aspect, a method for scheduling threads in a 3D stacked chip is provided. The method comprises the steps of: (a) estimating intrinsic droop intensity of a plurality of threads from one or more applications; (b) sorting the threads in descending order in terms of the intrinsic droop intensity and enqueuing them into a queue; (c) selecting the thread at the head of the queue and placing it in an available core of the bottommost available die; and (d) checking if the queue is empty, and repeating step (c) until the queue is empty.

In a four example embodiment embodying a four aspect, a system for scheduling threads in a 3D stacked chip is provided. The system comprises means for estimating intrinsic droop intensity of a plurality of threads from one or more applications; means for sorting the threads in descending order in terms of the intrinsic droop intensity and enqueuing them into a queue; means for selecting the thread at the head of the queue and placing it in an available core of the bottommost available die; and means for checking if the queue is empty.

Other aspects and embodiments are described in more detail below.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures are not described in detail in order to not unnecessarily obscure the present invention.

Figure 3:
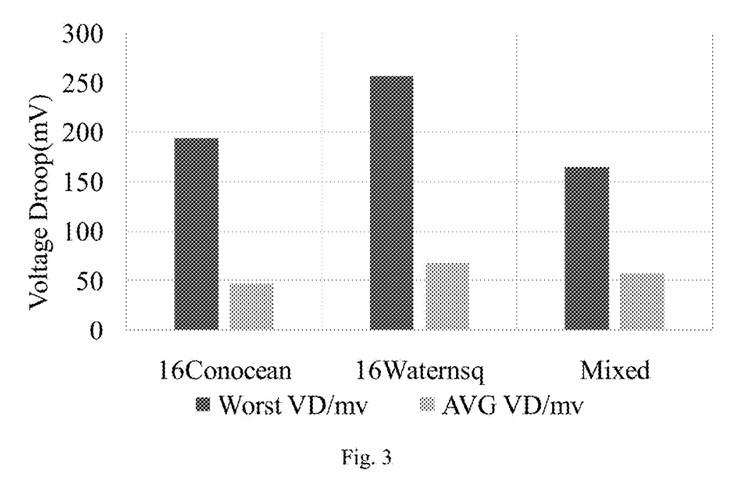
FIG. 3 is an exemplary comparison diagram showing the maximum and average voltage droop by running 16 threads of conocean and waternsq applications for 1 million cycles.

The present invention finds that voltage droop is asymmetrically distributed in both space and in time in 3D chips. And, the amplitude of voltage droop varies with different execution phases and the worst-case voltage droop is much more serious than the average case but rarely occurs. Taking Conocean and Waternsq threads as an example, FIG. 3 is a comparison diagram showing the maximum and average voltage droops by running 16 threads of each application for 1 million cycles. As can be seen from the figure, regarding the scenarios of running 16 Conocean threads or Waternsq threads, the amplitude of the worst-case voltage droop is almost four times greater than the average-case voltage droop. However, based on experimental data, the chance of such a large voltage droop (≤−130 my) is only 0.6%. Therefore, it is power-inefficient to allocate a large voltage margin conservatively for the worst-case voltage droop.

Thread diversity can mitigate horizontal interference. As shown in FIG. 3, in the scenario of running eight Conocean threads and eight Waternsq threads simultaneously, namely running mixed threads, the worst-case voltage droop turns out to be much less than any of the above solo scenarios. This is mainly because of the interference among the neighboring threads in the same plane. Threads with similar switching activity introduce voltage resonance among the active cores, which is referred to as destructive interference. Threads invoked by the same application often have similar power traces and are highly likely to produce destructive interference. Meanwhile, when threads with diverse behaviors are arranged together, a voltage-mild thread helps stabilize a voltage-violent one. Such interaction can reduce the worst voltage droop and is referred to as constructive interference. Thus, the first two scenarios in FIG. 3 generate higher voltage droop than the mixed scenario. Leveraging thread diversity can eliminate large voltage droop by avoiding destructive interference among cores.

Figure 4:
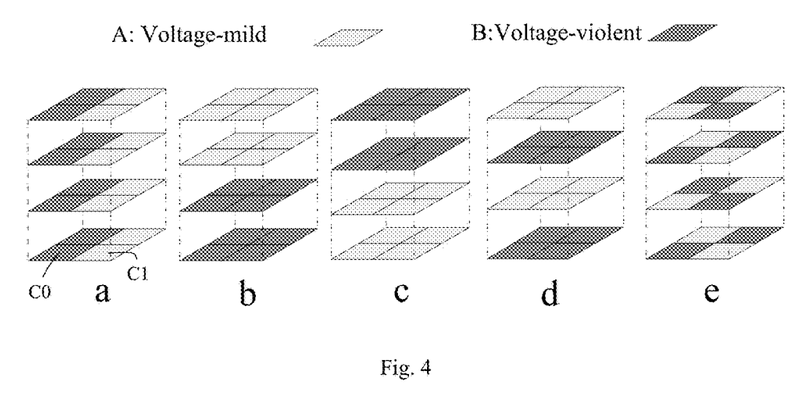
FIG. 4 is an exemplary figure showing different scenarios of threads allocation.
Figure 5:
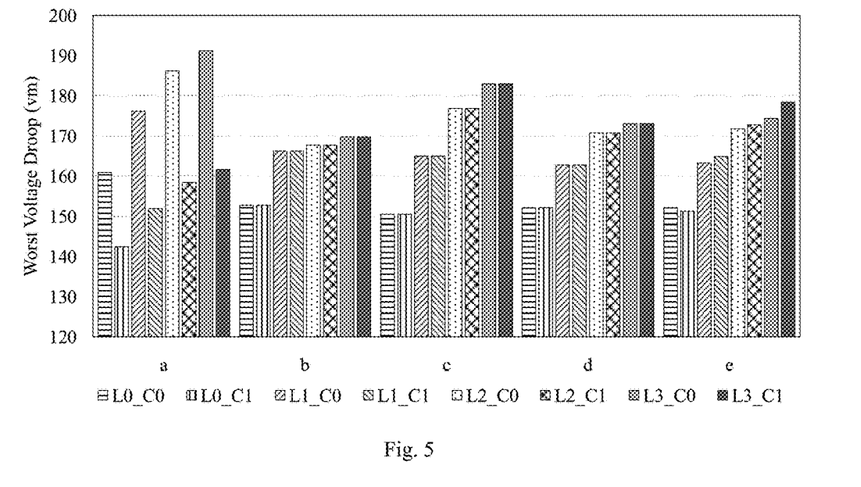
FIG. 5 shows corresponding worst voltage droop in the different scenarios shown in FIG. 4.

In 3D stacked chips, in addition to horizontal interaction, there is vertical interaction among threads in dies located in different layers, which also affects voltage droop. For example, FIGS. 4 and 5 are exemplary figures showing how vertical interaction and horizontal interaction affect voltage droop. FIG. 4 is an exemplary figure showing different scenarios of thread allocation. Thread A represents a voltage-mild thread, while thread B is voltage-violent with twice the sinusoidal amplitude of A. FIG. 5 shows corresponding worst voltage droop in different scenarios shown in FIG. 4. There are four layers of dies in the example of FIG. 4 and each layer of die has four cores. In Scenario (a), threads invoked by the same application are allocated in various layers in the same vertical direction, while (b) illustrates a scenario in which the most violent threads are arranged in the bottom layers.

The corresponding voltage droops of scenarios (a) and (b) are shown in FIG. 5. C0 and C1 shown in FIG. 4 stand for the two cores executing the two different kinds of threads in each layer. The worst-case voltage droop in scenario (a) is about 14% larger than that in (b), which implies that the vertical interference is more serious than the horizontal resonance effect and would amplify the voltage droop. Meanwhile, scenario (a) has larger intra-layer gap among cores than (b). The worst-case voltage droop of C0 is about 13% larger than C1, which implies that vertical interference could potentially enlarge the intra-layer imbalance.

Scenario (b), (c), (d) and (e) are compared to illustrate the influence of violent thread location on voltage droop. The strategy in (c) in FIG. 4 is to place the most violent threads in the topmost layer. The strategy in (d) is to interleave voltage-violent and voltage-mild threads along the vertical direction. The strategy in (e) is to interleave different types of threads both in the horizontal and vertical directions.

As we can observe in FIG. 5, scenario (c) results in the worst voltage droop among the four scheduling methods. Scenario (b) outperforms other cases in terms of the worst-case voltage droop, which implies that arranging violent threads farther from the voltage source will cause large voltage droop. Even though scenario (e) tries to alleviate both horizontal and vertical core resonance, the location of voltage-violent threads exerts more impact on voltage droop, which is considered as the first-order factor for thread-mapping.

Thus, from FIG. 4 and FIG. 5, it can be seen that there is a large gap between common-case and the worst-case voltage droop. Thread diversity can mitigate destructive horizontal interference. Vertical interference is more serious than the horizontal interference. The location of voltage-violent threads exerts an important impact on voltage droop, which is a dominant considering factor for thread scheduling.

The above implies that voltage margin is distributed unevenly in 3D chips during the execution of one or more applications. Allocating the worst-case margin for the entire chip would waste power. Thus, to resolve such issues, the present invention provides a new hardwire design for 3D chips to avoid wasting voltage margin. Generally, the new hardwire design for 3D chip equips the 3D chip with a power delivery system with multiple frequency domains such that every layer of the 3D chip can work at an individual frequency and be controlled separately.

Figure 6:
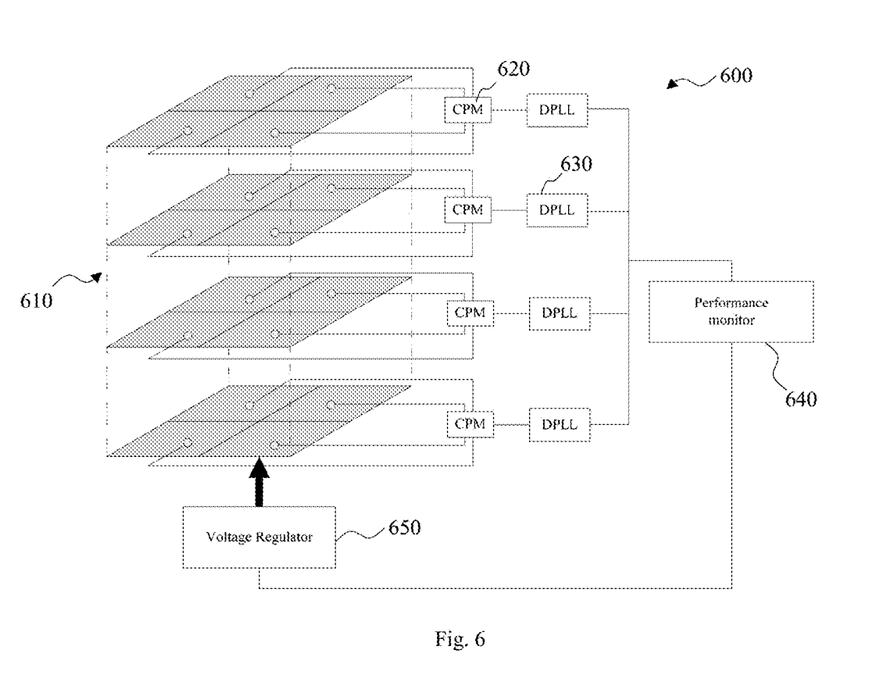
FIG. 6 shows a multichip system and system for separately controlling every layer of a 3D chip according to one explanatory embodiment.

As an exemplary embodiment, FIG. 6 shows a hardware design for separately controlling every layer of a 3D chip. According to FIG. 6, a multichip system 600 may comprise a plurality of dies 610, and each of the plurality of dies comprises a voltage violation sensing unit 620 and a frequency tuning unit 630. As shown in FIG. 6, the voltage violation sensing unit 620 can be a critical-path monitor (CPM) 620. The frequency tuning unit 630 can be a digital-phase locked loop (DPLL) 630. In addition, as shown in FIG. 6, the multichip system 600 also may comprise performance monitor 640 configured to supervise the working frequency of the system periodically and voltage regulator 650 configured to regulate the voltage provided to the plurality of dies 610.

In the illustrative embodiment shown in FIG. 6, 610 altogether has four dies, namely four layers of dies. Each die includes four cores 660. Of course, the plurality of dies 610 and cores are not limited to that shown in FIG. 6. The multichip system also may comprise more or fewer dies and each die also may comprise more or fewer cores. Moreover, in addition to core dies, the multichip system may comprise cache one or more dies stacked over or below core dies.

In the exemplary example of FIG. 6, each die comprises a CPM and each core in the die is connected with the CPM comprised on the die. The CPM is further connected to a corresponding DPLL 630. In addition, each DPLLs are further connected to a performance monitor 640 which in turn is connected to a voltage regulator 650.

In the system shown in FIG. 6, power is delivered from a bottom layer and goes through the middle layers to the upper layers. As described above, cores in the upper layers may have larger voltage droop than the lower layers because longer power delivery path consumes more power. The gap between the worst cases of the bottom layer and top layer can reach 30 mv. In addition, the voltage violations in the upper layer occur more frequent than in the lower layers. To mitigate inter-layer interference, the layer-independent design in FIG. 6 allows each layer to work at its appropriate frequency and make adjustments or recovery locally without affecting others. For example, when a core reduces the local frequency to avoid a potential timing error, other layers will not be interrupted and can continue full-speed execution.

To solve voltage violation issues, in the multichip system of FIG. 6, the output of a CPM indicates the timing margin of the monitored critical paths. Timing delay is affected by multiple factors such as process, thermal, aging and voltage. The thermal and aging influences are sluggish; thus, most transient timing violations are related to voltage variation. Therefore, transient variation of CPM can be interpreted as voltage variation. To save power, the voltage margin in the present invention is set for common-case voltage droop instead of the worst-case voltage droop. Once CPM senses a voltage violation in each core, the DPLL can tune the frequency quickly to avoid a timing error. Studies have shown that fast DPLL is able to turn down about 7% of peak frequency in several cycles.

In addition, through connecting with all DPLLs, the performance monitor 640 can supervise the average working frequency of the multichip system periodically to maintain performance. In addition, through connection with the DPLLs, the performance monitor 640 can supervise the working frequency of the system. When the frequency exceeds an upper threshold, it indicates voltage margin is over-provisioned for that period of time. When frequency is lower than a lower bound, it indicates the supplied voltage is insufficient and needs to be raised. Then, the voltage regulator starts to tune the corresponding voltage supplied to the 3D chip. The tuning resolution can be set in advance such as 6.25 mv. It takes several micro-seconds to complete the tuning process.

The present invention also provides a method for scheduling threads in a 3D stacked chip. As shown in FIG. 5, diverse thread distributions have different impacts on voltage droop. Thus, to minimize the worst-case voltage droop and the number of voltage violations, the voltage droop characteristics of each thread are quantified. Whether a thread is voltage-violent or voltage-mild can be predicted according to the intrinsic droop intensity (IDI) of the thread. Voltage-violent threads have higher IDI, while voltage-mild threads have lower IDI.

The present invention finds there are three guidelines for thread scheduling: (1) Arranging the voltage-violent threads in the lower layers (i.e., the layer close to power delivery system), otherwise it will induce serious voltage droop in the vertical chip stack; (2) clustering the threads with close IDI into one layer to mitigate vertical interference and minimize the asymmetric voltage margin of cores in one layer. As mentioned above, resonance in vertical direction can arouse larger voltage droop than horizontal direction, so it is reasonable to put similar threads in the same die instead of the same vertical stack. In addition, the worst voltage droop of cores varies with the aggressiveness of threads. While the whole layer shares a frequency-monitoring and actuation system, timing margin needs to tolerate the worst thread, leading to margin waste for the mild cores. This strategy smoothes the intra-layer gaps among cores; (3) in the same die, placing threads of different applications in the same neighborhood is helpful to reduce local voltage resonance induced by similar pipeline activities.

Figure 7:
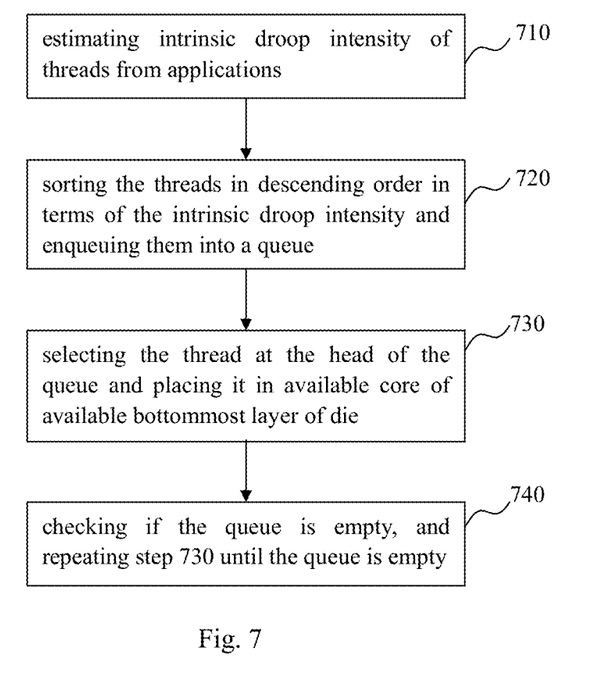
FIG. 7 is a flow chart illustrating a method for scheduling threads in a 3D stacked chip according to one explanatory embodiment.

An exemplary embodiment for the method for scheduling threads in a 3D stacked chip of the present invention may comprise the following steps as shown in FIG. 7. First, in step 710, estimating IDI of a plurality of threads from one or more applications; then, in step 720, sorting threads in descending order in terms of IDI and enqueuing them into a queue; and then, in step 730, selecting the thread at the head of the queue and placing it in an available core of the bottommost available layer of die; then, in step 740, checking if the queue is empty, and repeating step 730 until the queue is empty.

In addition, in the step 720, if multiple threads have the same IDI, a round-robin algorithm may be employed to choose threads from different applications for alleviating horizontal interference.

Regarding step 710, voltage droop is strongly associated with pipeline activities, so micro-architectural events information captured by performance counter can be used to estimate IDI of a thread from applications so as to predict whether a thread is voltage-violent or voltage-mild, which is known in the art. Statistical learning can be used to correlate performance counter inputs (such as branch-misprediction intensity, cache miss intensity, TLB miss intensity) with thread voltage droop intensity. Because these runtime statistics are nonlinearly correlated, the regression tree is an ideal approach to cope with such a relationship. Such model training process can be conducted off-line. During the training period, performance counter information and corresponding droop intensity of threads are gathered as the training set to generate a regression tree. The droop intensity can be calculated by using online measuring sensors such as Critical Path Monitor (CPM). To avoid interferences, during the training stage only one thread may be running in a power domain at a time. When the regression tree is trained to reach a stable state, it can be built into target chips to predict thread voltage features.

Figure 8:
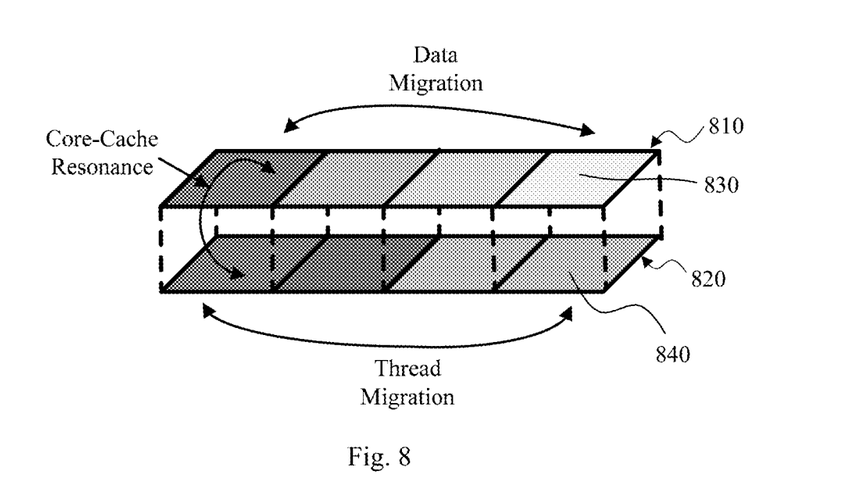
FIG. 8 shows an exemplary 3D stacked chip including both core layer and cache layer.

In addition, a 3D chip can comprise both core and cache or memory, in which one or multiple cache layers are stacked on top of the core layer. For example, FIG. 8 shows an exemplary 3D chip including both core layer and cache layer, in which cache layer 810 is stacked on top of the core layer 820. The cache layer 810 may include a plurality of cache banks 830. The core layer 820 may include a plurality of cores 840. One or more threads can be executed in the plurality of cores 840. During executing the threads, data are frequently stored in or fetched from the cache banks. Cache activities also exhibit fluctuate current drawing in a power delivery network. The power consumption of the cache changes with the frequency of cache accesses. For example, the power consumption becomes larger when threads have a lot of data interactions. Therefore, it will cause core-cache dice resonances in the same vertical stack. In such case, it is necessary to monitor the cache behavior as well as cores and estimate the power consumption of cache banks. Thread scheduling or data remapping will be triggered when core-cache dice resonances occur, as shown in FIG. 8. The core-cache resonance can be avoided by departing the voltage-violent thread and cache bank either through migrating the data to a remote cache bank (see the arrow above the cache layer 810 in FIG. 8) or allocating a voltage-mild thread to the core (see the arrow below the core layer 820 in FIG. 8).

Before migrating the data to a remote cache bank or allocating a voltage-mild thread to the core to mitigate or avoid the core-cache resonance, it is necessary to monitor the cache behavior. A regression model can be used to conduct correlations between access intensity and voltage droop intensity of one cache bank. The training stage of the regression model is also conducted off-line. During prediction stage, a monitor takes access count of each cache bank as input to predict the voltage droop intensity. So it is necessary to add a cache bank access counter to core or cache dice to record the access for cache emergency identification. If the monitor component is implemented in the core, the address of the read/write request is converted to the cache bank ID. Then the corresponding counter is incremented upon each cache access. If the monitor is implemented in cache side, the monitor can be embedded in the reading/writing circuitry of banks. Relative bank's access counter is incremented upon each data access. Then, if the cache behavior indicates there is a core-cache dice resonance in the 3D chip, depart the voltage-violent thread and cache bank either through migrating the data to a remote cache bank or allocating a voltage-mild thread to the core.

In one or more examples herein, the thread scheduling method described above may be implemented through software. Computer-readable codes for realizing the functions of the steps of the thread scheduling method can be stored in a computer-readable medium. Examples of computer-readable media include, but are not limited to: magnetic media such as hard disks, floppy disks, and magnetic tape; optical media such as CD-ROMs and holographic devices; magneto-optical media such floptical disks; and hardware devices that are specially configured to store and execute program code, such as application-specific integrated circuits (ASICs), programmable logic devices and ROM and RAM devices. The computer-readable codes can be executed by one or more processing units.

Figure 9:
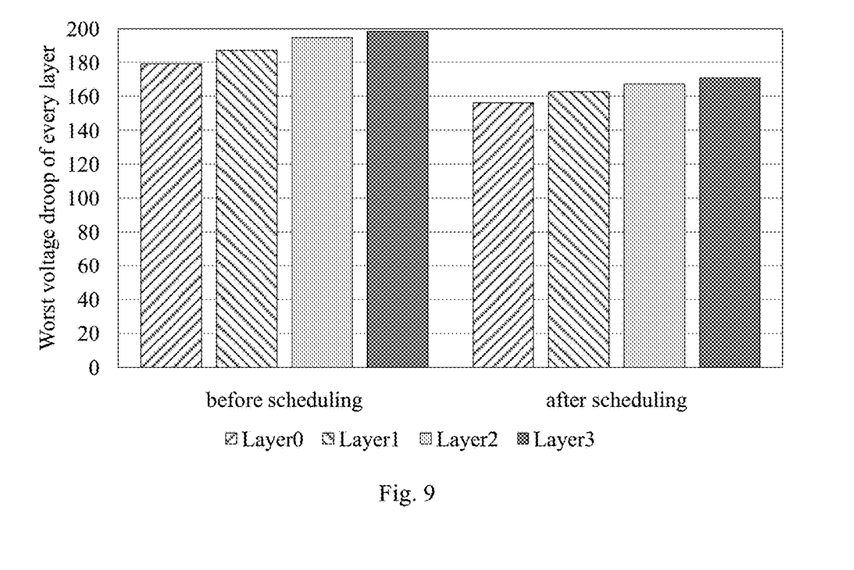
FIG. 9 is a comparison diagram showing the worst voltage droop of every die layer before and after executing the thread scheduling method of the present invention.

By using the layer-independent control system of present invention, the average reduction of voltage violations can reach up to, for example, 40%. And, the thread scheduling method of present invention can mitigate voltage droop in every layer and reduce the voltage droop in a 3D chip, for example by 13% as shown in FIG. 9. This is because the present invention makes voltage feature prediction for threads and proactively schedules threads to minimize large voltage droops. In addition to reducing voltage violations, the thread scheduling method can also reduce the voltage margin for common-case voltage droop by for example about 9%. Besides, the scheduling method of present invention can close the gap of voltage droops inside one layer. The gap of the worst voltage droop in layer 0 was about 20 mv; after scheduling, the gap of layer 0 is only 6 mv. It should be noted that with the variation of the number of layers of die and the architecture of the chip, the effect of the reduction of voltage violations or voltage droop also will change.

It will be apparent to those skilled in the art the embodiments described above is only illustrative and cannot be deemed as a limitation to present invention, and that various modifications and variations can be made to the embodiments described herein without departing from the spirit and scope of the claimed subject matter. Thus, it is intended that the specification covers modifications and variations of the various embodiments described herein, provided such modification and variations come within the scope of the appended claims and their equivalents.

The invention claimed is:

1. A method carried out by a 3D stacked chip system, for scheduling threads in the 3D stacked chip system, the method comprising the steps of:
   (a) estimating intrinsic droop intensity of a plurality of threads from one or more applications;
   (b) sorting the threads in descending order in terms of the intrinsic droop intensity and enqueuing them into a queue;
   (c) selecting the thread at the head of the queue and placing it in an available core of the bottommost available die of the 3D stacked chip; and (d) checking if the queue is empty, and repeating step (c) until the queue is empty.

2. The method of claim 1, wherein if multiple threads are estimated to have the same intrinsic droop intensity, employing a round-robin algorithm to choose threads from different applications to alleviate interference in horizontal direction.

3. The method of claim 1, further comprising departing a voltage-violent thread executed in a core of the 3D stacked chip and the cache bank in the 3D stacked chip through migrating data in the cache bank to a remote cache bank or allocating a voltage-mild thread to the core to avoid core-cache resonance when a cache behavior monitoring indicates a core-cache resonance occurs.

4. The method of claim 2, further comprising departing a voltage-violent thread executed in a core of the 3D stacked chip and the cache bank in the 3D stacked chip through migrating data in the cache bank to a remote cache bank or allocating a voltage-mild thread to the core to avoid core-cache resonance when a cache behavior monitoring indicates a core-cache resonance occurs.

5. A system for scheduling threads in a 3D stacked chip system, comprising:
   means for estimating intrinsic droop intensity of a plurality of threads from one or more applications;
   means for sorting the threads in descending order in terms of the intrinsic droop intensity and enqueuing them into a queue;
   means for selecting the thread at the head of the queue and placing it in available core of the bottommost available die; and
   means for checking if the queue is empty.

6. The system of claim 5, further comprising:
   means for employing a round-robin algorithm to choose threads from different applications to alleviate interference in horizontal direction.

7. The system of claim 5, further comprising:
   means for departing a voltage-violent thread executed in a core of the 3D stacked chip and the cache bank in the 3D stacked chip through migrating data in the cache bank to a remote cache bank or allocating a voltage-mild thread to the core to avoid core-cache resonance when a cache behavior monitoring indicates a core-cache resonance occurs.

8. The system of claim 6, further comprising:
   means for departing a voltage-violent thread executed in a core of the 3D stacked chip and the cache bank in the 3D stacked chip through migrating data in the cache bank to a remote cache bank or allocating a voltage-mild thread to the core to avoid core-cache resonance when a cache behavior monitoring indicates a core-cache resonance occurs.

\* \* \* \* \*